United States Patent Office 3,455,984
Patented July 15, 1969

3,455,984
4-SUBSTITUTED 1-CYANOACETYL-3-THIOSEMICARBAZIDES
Real Laliberte, Laval, Quebec, and David Campbell, Pincourt, Quebec, Canada, assignors to American Home Products Corporation, New York, N.Y., a corporation of Delaware
No Drawing. Filed Dec. 6, 1966, Ser. No. 599,407
Int. Cl. C07c 159/00
U.S. Cl. 260—464                        5 Claims

ABSTRACT OF THE DISCLOSURE

There are disclosed herein the compounds 4-methyl-, 4-allyl-, 4-cyclohexyl-, and 4-phenyl-1-cyanoacetyl-3-thiosemicarbazine, as well as a process for their preparation. Mention is also made of the following 4-substituted-1-cyanoacetyl-3-thiosemicarbazides: 4-(lower alkyl)-, containing from 2–6 carbon atoms in the lower alkyl group; 4-cycloheptyl or 4-cyclooctyl; 4-(substituted-phenyl)- in which the substituents on the phenyl group are one or more atoms of fluorine, chlorine, or bromine, ethyl, propyl, or butyl groups, or the phenyl group; and benzyl, chlorobenzyl, or dichlorobenzyl groups. The compounds are useful as anti-parasitic and antifungal agents, and method for their use are also given.

The present invention relates to 4-substituted-cyanoacetyl-3-thiosemicarbazides of the general formula I

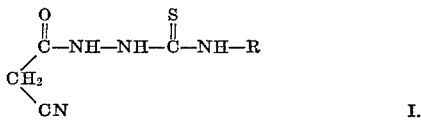

I.

in which R represents a lower alkyl group containing from 1–6 carbon atoms, an unsaturated lower alkyl group such as, for example, the allyl group, the cycloaliphatic group containing from 6–8 carbon atoms, such as, for example, the cyclohexyl cycloheptyl, or cyclooctyl groups, an aromatic group containing from 6–12 carbon atoms which may also be substituted with one or more lower alkyl groups containing from 1–4 carbon atoms, with one or more halogen atoms of an atomic weight less than 80, a nitro group, or a lower dialkylamino group such as, for example, the dimethyamino group, or an aromatic aliphatic group such as, for example, the benzyl group which may also be substituted with one or more halogen atoms of an atomic weight less than 80. Examples of R representing an aromatic group with the phenyl representing the 2-, 3-, or 4-tolyl group, the 2-, 3-, or 4-ethylphenyl group, the 4-propylphenyl, the 4-butylphenyl, and the 4-diphenylyl groups; examples of aromatic-aliphatic groups being represented by the symbol R with the benzyl group the 3- or 4-chlorobenzyl group, and the 2,5-, or 3,4-dichlorobenzyl group.

The compounds of this invention possess important biological properties and are valuable as medicaments. Thus, for example, the compound of Formula I in which R represents the methyl group has larvicidal activity and may be used in premises or pastures infested with horse strongyles or other members of the Strongylidai Family for example, hookworms, trichostrongylidae or metastrongylidae. For this purpose the compound may be formulated as a suspension in an aqueous vehicle in an amount within the range of from 0.01 to 0.0005 mole per litre.

Some of the compounds of this invention have also activity against adult worms of the Oxyuridae family, for example, against *Syphacia obvelata* and *Aspicularis tetraptera*. One example of such compounds is 4-allyl-1-cyanoacetyl-3-thiosemicarbazide of Formula I in which R represents the allyl group. Such compounds may be formulated with suitable excipients in the form of tablets or capsules, for oral administration and may be administered in single or divided doses of from 100–500 mg. of the active ingredient.

Other compounds of this invention, for example, 4-phenyl-1-cyanoacetyl-3-thiosemicarbazide of Formula I in which R represents the phenyl group, are fungicidal agents, especially active against *Candida albicans*, or *Microsporum gypseum*. As such they may be formulated with suitable solvents or excipients in the form of solutions or ointments containing from 0.1 to 2% of the active ingredient, and may be administered topically to infected areas of the skin.

Most specifically the compounds of this invention are prepared by heating together, in a suitable solvent such as, a lower alkanol, preferably ethanol, approximately equimolar quantities of cyanoacethydrazide and an appropriate alkyl or aryl isothiocyanate. The compounds are isolated and purified by crystallization.

The following formulae in which R has the significance defined above and Examples will illustrate this invention. The compositions of all compounds are confirmed by elemental analysis.

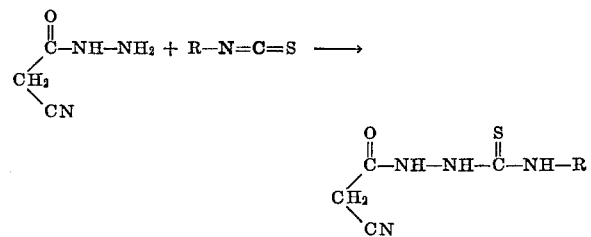

EXAMPLE 1

4-allyl-1-cyanoacetyl-3-thiosemicarbazide

A solution in isopropanol of allyl isothiocyanate (0.05 mole) and cyanoacethydrazide is refluxed for 6 hours and is allowed to stay at room temperature overnight. The white solid is filtered off and crystallized from 200 mls. of isopropanol to M.P. 148–1490 C.

EXAMPLE 2

4-cyclohexyl-1-cyanoacetyl-3-thiosemicarbazide

To 0.055 mole of 1-cyanoacethydrazide in 50 mls. of ethanol, 0.055 mole of cyclohexyl isothiocyanate are added and the mixture is refluxed for 3 hours. On cooling, a solid is found which is filtered off and crystallized from methanol to M.P. 176–178° C.

In the same manner, but using cycloheptyl or cyclooctyl isothiocyanate as starting material, the corresponding 4-cycloheptyl- or 4-cyclooctyl-1-cyanoacetyl-3-thiosemicarbazides are also obtained.

EXAMPLE 3

4-methyl-1-cyanoacetyl-3-thiosemicarbazide

Methyl isothiocyanate (0.1 mole) is added to 0.1 mole of cyanoacethydrazide in 100 mls. isopropanol. The mixture is refluxed for 1 hour and kept at room temperature overnight. The solid is filtered off and crystallized from isopropano to M.P. 150–151° C.

In the same manner, but using ethyl-, propyl-, butyl-, isobutyl-, tert.-butyl-, pentyl-, or hexyl-isothiocyanate as starting materials, the corresponding 4-ethyl-, 4-propyl-, 4-butyl-, 4-isobutyl-, 4-tert.-butyl-, 4-pentyl-, or 4-hexyl-1-cyanoacetyl-3-thiosemicarbazides are also obtained.

EXAMPLE 4

4-phenyl-1-cyanoacetyl-3-thiosemicarbazide

Phenylisothiocyanate (0.05 mole) is added to 0.05 mole of cyanoacethydrazide in 75 mls. of isopropyl alcohol. The mixture is refluxed for one hour, on cooling a white solid separates which is filtered off and crystallized from nitromethane to M.P. 178–180° C.

In the same manner, but using 2-, 3-, or 4-chloro- or -bromophenyl-, 4-fluorophenyl-, 2,3-, 2,4-, 2,5-, 3,4- or 3,5-dichlorophenyl-, 2,4-dibromophenyl-, 4-nitrophenyl-, 4-dimethylaminophenyl-, 2-, 3-, or 4-tolyl-, 2-, 3-, or 4-ethylphenyl-, 4-propylphenyl-, 4-butylphenyl-, or 4-diphenyl-isothiocyanate as starting materials, the corresponding 4-(2'-, 3'-, or 4'-chloro- or bromophenyl)-, 4-(4'-fluorophenyl)-, 4-(2',3'-, 2',4'-, 2',5'-, 3',4'- or 3',5'-dichlorophenyl)-, 4-(2',4'-dibromophenyl)-, 4-(4'-nitrophenyl)-, 4-(4'-dimethylaminophenyl)-, 4-(2'- or 3'- or (4'-tolyl)-, 4-(2'- or 3'- or 4'-ethylphenyl)-, 4-(4'-propylphenyl)-, 4-(4'-butylphenyl)-, 4-(4'-diphenylyl)-1-cyanoacetyl-3-thiosemicarbazides are also obtained.

In the same manner, but using benzyl-, 3- or 4-chlorobenzyl-, or 2,5- or 3,4-dichlorobenzyl-isothiocyanate as the starting material, the corresponding 4-benzyl-, 4-(3' or 4'-chlorobenzyl)-, or 4-(2',5'- or 3',4'-dichlorobenzyl)-1-cyanoacetyl-3-thiosemicarbazides are also obtained.

We claim:
1. A compound selected from those of the formula

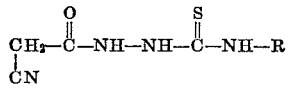

wherein R is selected from the group which consists of lower alkyl containing from one to six carbon atoms; allyl; cycloalkyl containing from six to eight carbon atoms; phenyl; 4-fluorophenyl, 2-chlorophenyl, 3-chlorophenyl, 4-chlorophenyl, 2,3-dichlorophenyl, 2,4-dichlorophenyl, 2,5-dichlorophenyl, 3,4-dichlorophenyl, 3,5-dichlorophenyl, 2,4-dibromophenyl, 4-nitrophenyl, 2-methylphenyl, 3-methylphenyl, 4-methylphenyl, 2-ethylphenyl, 3-ethylphenyl, 4-ethylphenyl, 4-propylphenyl, 4-butylphenyl, 4-diphenylyl, 4-dimethylaminophenyl, benzyl, 3-chlorobenzyl, 4-chlorobenzyl, 2,5-dichlorobenzyl, and 3,4-dichlorobenzyl.

2. 4-allyl-1-cyanoacetyl-3-thiosemicarbazide.
3. 4-cyclohexyl-1-cyanoacetyl-3-thiosemicarbazide.
4. 4-methyl-1-cyanoacetyl-3-thiosemicarbazide.
5. 4-phenyl-1-cyanoacetyl-3-thiosemicarbazide.

References Cited

UNITED STATES PATENTS 2,940,956   6/1960   Smith _____ 260—465.4
3,053,732   9/1962   Greenhalgh _____ 260—465.4

CHARLES B. PARKER, Primary Examiner

S. T. LAWRENCE III, Assistant Examiner

U.S. Cl. X.R.

260—454, 465, 465.4; 424—304